(12) United States Patent
Sher et al.

(10) Patent No.: US 6,261,610 B1
(45) Date of Patent: Jul. 17, 2001

(54) CALCIUM-MAGNESIUM FORTIFIED WATER, JUICES, BEVERAGES AND OTHER LIQUID FOOD PRODUCTS AND PROCESS OF MAKING

(75) Inventors: Alexander A. Sher, Danbury; Chandrasekhara Reddy Mallangi, New Milford; Dinakar Panyam, New Milford; Dharam Vir Vadehra, New Milford, all of CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/405,243

(22) Filed: Sep. 24, 1999

(51) Int. Cl.⁷ .................................................. A23L 1/304
(52) U.S. Cl. ........................ 426/74; 426/573; 426/590; 426/599
(58) Field of Search ........................... 426/74, 590, 573, 426/599

(56) References Cited

U.S. PATENT DOCUMENTS

| | | | |
|---|---|---|---|
| 4,740,380 | 4/1988 | Melachoris et al. | 426/590 |
| 4,786,510 | 11/1988 | Nakel et al. | 426/74 |
| 4,871,554 | 10/1989 | Kalala et al. | 426/74 |
| 5,208,372 | 5/1993 | Vidal et al. | 562/584 |
| 5,500,232 | 3/1996 | Keating | 426/74 |
| 5,817,351 | 10/1998 | DeWille et al. | 426/74 |
| 5,834,045 | 11/1998 | Keating | 426/74 |
| 5,851,578 * | 12/1998 | Gandhi | 426/74 |
| 6,036,985 * | 3/2000 | Jacobson et al. | 426/74 |

OTHER PUBLICATIONS

Abstract of WO9832344, Mar. 1988.
Abstract of WO9312672, Jul. 1993.
Abstract of WO9207475, May 1992.
Abstract of EP 875153, Nov. 1998.
Abstract of J0 9–175994, Jul. 1997.
Abstract of J0 9–238645, Sep. 1997.
Abstract of J0 8–112059, May 1996.
Abstract of J0 7–228533, Aug. 1995.
Abstract of DE 4111040, Jun. 1992.
Abstract of EP 323667, Jul. 1989.
Abstract of GB 2207335, Feb. 1989.
Abstract of EP 297681, Jan. 1989.
Abstract of ZA 8700325, Jul. 1987.
Abstract of J60–034130, Feb. 1995.
Abstract of J55–088685, Jul. 1980.
Abstract of J10–014535, Jan. 1998.
Abstract of DE29719136, Feb. 1998.

* cited by examiner

*Primary Examiner*—Helen Pratt
(74) *Attorney, Agent, or Firm*—Pennie & Edmonds LLP

(57) ABSTRACT

A composition of a fortified liquid food or beverage product containing a fortifying amount of a metastable Calcium Lactate-Citrate or Calcium-Magnesium Lactate-Citrate complex formed by the interaction of an alkaline calcium source with a mixture of lactic and citric acids and optionally stabilized with carbohydrates. Also, methods for forming these complexes.

18 Claims, No Drawings

CALCIUM-MAGNESIUM FORTIFIED WATER, JUICES, BEVERAGES AND OTHER LIQUID FOOD PRODUCTS AND PROCESS OF MAKING

FIELD OF INVENTION

The present invention relates to the fortification of water, juices and beverages or other liquid food products with meta-stable Calcium Lactate-Citrate or Calcium-Magnesium Lactate-Citrate complexes which are optionally stabilized with carbohydrates.

BACKGROUND OF THE INVENTION

Calcium, the most abundant mineral in the body, is a major constituent of bone and teeth. This mineral also plays an important role in several physiological systems. Calcium is important for healthy bone and tooth development in the young and an adequate intake is essential. Calcium status may also be a factor in the development of osteoporosis in elderly people.

Since the body does not produce minerals, it is totally dependent on an external supply of calcium which is nutritional or supplementary. The importance of adequate calcium intake is recognized during the whole life of the human being. In 1994, the NIH Consensus Development Panel revised recommended daily allowances for calcium intake for each age group from 800–1200 mg per day to 1500 mg per day.

It has been found that organic acids salts of calcium are more bioavailable in general than the inorganic salts. Calcium citrate has advantages over other calcium salts for use in fortified foods because of its high bio-availability. Calcium citrate, as opposed to calcium in general, has only a marginal effect of interfering with the absorption of other minerals, especially iron. Also, long-term calcium supplementation with calcium lactate-citrate can reduce the risk of the formation of kidney and urinary stones since citrate ions are inhibitors of crystallization of stone-forming calcium salts.

Magnesium also plays an important role in the human organism. The adult body contains 20–28 g of magnesium, approximately 60% of which is present in the skeleton, 40% resides in the muscles and soft tissues and about 1% in the fluid. Magnesium participates in numbers of biochemical and physiological processes such as biosynthesis, glycolysis, transmission of the genetic code, enzyme activation, etc. Further, extracellular magnesium is critical to the maintenance of electrical potential of nerve and muscle membranes and for transmission of impulses across neuro-muscular junctions. The RDA for adults of both sexes is accepted to be 4.5 mg/kg, or 280 mg for women and 350 mg per day for men aged 19 and above (Recommended Dietary Allowances, National Academy Press, Washington, D.C., 1989, 10th Edition).

The addition of calcium to water or clear beverages presents very significant problems. Firstly, if highly soluble sources of calcium (calcium chloride, etc.) are used, a high level of soluble calcium leads to undesirable flavor and destabilization of proteins. Secondly, slightly soluble sources of calcium will not cause destabilisation of protein micelles but they will precipitate out of the solution rapidly. Accordingly, the solubility of calcium sources has to be balanced within a very small range of solubility to avoid such problems.

Therefore, it would be highly desirable to have calcium and calcium-magnesium sources to fortify water, juices, beverages and other liquid food products without coagulation and sedimentation, with improved palatability, and without bitterness or off-flavors.

J09175994 discloses an liquid calcium drink prepared by dissolving a calcium source, calcium carbonate or pulverized shell of oyster with malic and/or citric and lactic acid, particularly at ratios 1:1–20, followed by heating at 50–100° C. The advantage is to supply calcium with improved taste.

DE4111040 describes fruit juice enriched with a mixture tri-potassium citrate, calcium lactate, magnesium gluconate and ferrous gluconate. The pH of the fruit juice is preferably adjusted to 4.3 with lemon or lime juices. The advantage is supply minerals which may be insufficient in the diet, in a drink, in a form with a pleasant taste.

J55088685 describes a health drink composition containing calcium lactate, amino acid-rich vinegar, and optionally lactic acid, citric acid and/or apple vinegar in aqueous alkaline solution. The composition includes 500–1000 mg of calcium lactate and 500–3000 mg of amino acid-rich vinegar in 100 ml of solution and has a pH of 3.6–3.8 and a sugar content 6.5–10%. Optionally, 150–500 mg of lactic acid, 150–500 mg of citric acid and/or 500–2000 mg of apple vinegar are also combined in 100 ml of solution. Citric acid, honey, perfume, etc. are optionally included and combined. By using calcium lactate and amino acid-rich vinegar, the drink contains 1200 ppm of calcium. It is stated that calcium ions are easily absorbed and the drink prevents blood acidification and various diseases and disorders caused by calcium deficiencies.

Calcium and vitamin C containing beverages with improved color stability are described in U.S. Pat. No. 5,424,082. Stable nutritional vitamin and mineral supplemented beverages are described in U.S. Pat. No. 4,992,282.

A majority of these patents do not address the issue of the quantities of these drinks that must be consumed in order for one to obtain the daily recommended allowances of calcium and other nutrients from such preparations. Such nutritional drinks also lack organoleptic properties for good consumer acceptance. Accepted calcium salts such as calcium carbonate, calcium phosphate and calcium citrate for biological use tend to have very poor water solubility resulting in precipitation. Most soluble calcium salts have a very unpleasant bitter taste, while others (e.g., calcium glycerophosphate) are very expensive or, such as calcium lactate, have very low calcium content.

Thus, there is a need for good tasting bottled water, juices and beverages or other liquid foods that contain a sufficient amount of calcium to meet the US Daily Recommended Allowances.

SUMMARY OF THE INVENTION

We have found that metastable Calcium Lactate-Citrate complexes formed by the interaction of an alkaline calcium source such as calcium hydroxide, calcium oxide or calcium carbonate with a mixture of lactic and citric acids optionally stabilized with various carbohydrates such as sucrose, fructose, maltodextrins, corn syrup, etc. can be used to fortify liquid food and beverage products such as carbonated and non-carbonated water, clear juices and other low pH beverages or other liquid foods which are stable at refrigeration, room and high temperature conditions as well as which are capable of withstanding freezing/thawing cycles without precipitation and without changing organoleptic properties.

According to the present invention, there is provided a composition comprising a liquid food or beverage product and a fortifying amount of a metastable Calcium Lactate-Citrate or Calcium-Magnesium Lactate-Citrate complex formed by the interaction of an alkaline calcium source with a mixture of lactic and citric acids. The beverage product generally comprises a juice or fortified water, and is preferably clear or translucent, and the alkaline source for the calcium or magnesium may be an oxide, hydroxide or carbonate.

The complex may be stabilized with a carbohydrate, such as sucrose, fructose, glucose, corn syrup, maltodextrin, oligo- and polysaccharides or a mixture thereof. Alternatively, the complex may be present with an oligosaccharide or oligo- and polysaccharides, such as inulin or hydrolyzed inulin, to provide further benefits.

The invention also relates to a process of preparing a fortified liquid food or beverage product which comprises forming a metastable Calcium Lactate-Citrate or Calcium-Magnesium Lactate-Citrate of the types disclosed herein by the interaction of an alkaline calcium source with a mixture of lactic and citric acids, and incorporating a fortifying amount of the complex in a liquid food or beverage product. When the complex is stabilized with a carbohydrate, the carbohydrate may be added to the complex before the complex is added to the liquid food or beverage product. Generally, the carbohydrate is present in an amount of from 1–80% by weight based on the weight of the complex.

The invention also relates to a process for preparing a fortified liquid food or beverage product which comprises adding an alkaline calcium source with lactic and citric acids to the product and forming the complex in situ within the product. In this embodiment, the acids may be added one after another or as a mixture to the product before adding the alkaline calcium source in the form of a suspension or dry powder to the product. If desired, the lactic acid and calcium or calcium/magnesium source can be combined together first, then citric acid can be added to form the complex with this complex then being combined or added to the product.

DETAILED DESCRIPTION OF THE PREFERRED EMBODIMENTS

The Calcium Lactate-Citrate complexes of the present invention are preferably formed by mixing a suspension of an alkaline calcium source, e.g., calcium hydroxide, calcium oxide or calcium carbonate with the desired amount of solution of citric and lactic acids. Further, the order of addition of the ingredients results in the formation of a more stable Calcium Lactate-Citrate complex. Preferably, the lactic acid and calcium source are combined together first, and then the citric acid is added. These complexes possess all the advantages of the previous $K_3[CaCitrLact_2]$ complex described in U.S. Pat. No. 5,928,691, but have minor or no bitterness due to elimination of the potassium content. The preferred formula of the metastable complexes that do not contain potassium are [Ca Citr0.2 Lact 1.7] and [Ca Citr0.45 Lact0.95].

If desired, part of the calcium ions may be replaced by magnesium ions having the formula of:

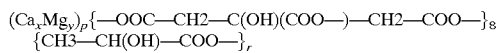

where the ratio of x to y could be from 1:99 to 99:1, but most preferably is from about 3 to 3.5:1, and where the subscripts p, q and r represent molarities of calcium hydroxide or magnesium hydroxide, citric and lactic acids, respectively. For every 1 mole of p; molar ratios of q may vary from about 20 to 0.2, and r may vary from about 0.2 to 20, respectively.

For reasons of simplicity, the Calcium Lactate-Citrate complexes referred to in this specification should be understood to include complexes where the metal ion is calcium or where some of the calcium is replaced by magnesium, i.e. the complexes may be Calcium Lactate-Citrate complexes or Calcium-Magnesium Lactate-Citrate complexes.

The Calcium-Magnesium Lactate-Citrate complexes of the present invention are preferably formed by mixing a suspension of an alkaline calcium source, e.g., calcium hydroxide, calcium oxide or calcium carbonate, with the appropriate quantity of a suspension of an alkaline magnesium source, e.g., magnesium hydroxide, magnesium oxide or magnesium carbonate, and then mixing with the desired amount of solution of citric and lactic acids.

Advantageously, the Calcium Citrate-Lactate or Calcium-Magnesium Citrate-Lactate complexes may be used in combination with various a saccharide component such as oligosaccharides or oligo- and polysaccharides. Preferred saccharide components include inulin or hydrolyzed inulin, products which are known in the trade as Raftilose P95 or Raftilin GR. The amount of oligosaccharides or oligo- and polysaccharides may be from about 0.1 to 25%, preferably from 0.2 to 2% and most preferably from 0.5 to 0.7% by weight based on the weight of the complex. This combination of the complex and inulin does not decrease the complex stability as no sediment formation is found. The combination of the metastable complex and inulin brings additional benefits, however, since it has been shown that dietary fiber enhances calcium absorption.

The complex can be added to any liquid food or beverage product. Preferably, it can be added to products that are clear or translucent, as the complex is clear or colorless. In particular, the complex can be added to water, a fruit or vegetable juice or to liquid food products containing such liquids. The amount of the complex present in the liquid food or beverage product is typically from about 0.05 to 95%, preferably from 0.1 to 25%, and more preferably from 0.2 to 5% by weight based on the weight of the liqiod food or beverage product.

The present invention also provides a process of preparing a fortified liquid food or beverage product which comprises adding a fortifying amount of a metastable Calcium Lactate-Citrate complex formed by the interaction of an alkaline calcium source with a mixture of lactic and citric acids.

Advantageously, carbohydrates may be added to the complex, preferably before the complex is added to the fortified water, low pH beverage, juice or liquid food product. The preferred carbohydrates are sucrose, fructose, maltodextrins and corn syrup. These carbohydrates are present in the complex in an amount of about 1–80% and preferably from 5–20% by weight based on the weight of the complex. The carbohydrates may also be added directly to the fortified water, beverage, juice or liquid food product in the form of an aqueous solution or as a dry powder.

The Calcium Lactate-Citrate complex can be made in situ. Thus, instead of forming the complex first and then adding it to the liquid food or beverage, the ingredients of the complex (e.g., an alkaline calcium source with lactic and citric acids) may be added to the fortified water, low pH beverage, juice or other liquid food to be fortified, either simultaneously or one after the other where they interact to form the complex. Preferably, the acids should be added first, before addition of the calcium source. In this embodiment, one or both ingredients may be added in solid form or as solutions or dispersions to obtain the fortified water, low pH beverage, juice or other liquid food product.

The present invention further provides a process of preparing a fortified, water beverage or juice which comprises adding an alkaline calcium source with lactic and citric acids to the foodstuff and then forming the complex within the foodstuff.

The following improvements and/or advantages are achieved using the hereinbefore defined complexes to fortify water, beverage or juice as in the present invention.

The calcium source is soluble in the liquid food product and is clear or colorless.

The complex provides improved palatability, with no bitterness or off-flavor.

The complex is stable without precipitation at refrigeration, room or high (100° F.) temperatures.

The complex is heat stable and can be subject to pasteurization, UHT pasteurization/sterilization without difficulties.

The complex is freeze/thaw resistant.

The complex has a decreased free calcium level, so that is does not cause protein coagulation or precipitation.

The complex may be prepared separately or in situ.

The use of calcium hydroxide provides a higher level of calcium of about 54% compared to, e.g., calcium lactate which would be about 13%.

The complex could be used to fortify a clear or translucent beverages or semi-liquid food products (e.g., jelly, yogurt, etc.) with excellent results.

EXAMPLES

The following examples further illustrate the preferred embodiments of the present invention.

Example 1

Citric acid (1.26 g) is dissolved in 80 g of water at room temperature, and then 4.30 g of 88% lactic acid solution are added to the citric acid solution under agitation. A dispersion of 2.22 grams of calcium hydroxide in 20 g of water is prepared. The calcium hydroxide suspension, water (132.2 g) and the solution of the two acids are combined and mixed for 5–10 minutes until the metastable complex is formed as a clear solution. The level of calcium in the complex is 5,000 ppm.

Example 2

The clear metastable complex (5,000 ppm Ca) formed in Example 1 was added to water up to a level of 1000 mg/L and no sedimentation occurred over three months storage at low (40° F.), room (20–25° F.) and high (100° F.) temperatures. The fortified water was subjected to freeze/thaw cycles and no sedimentation occurred.

Example 3

A clear metastable complex is prepared according to this invention containing 6,000 ppm Ca and is stabilised with 10% sucrose. The stabilised complex was added to Apricot Nectar @12 and 25% RDA up to a level of 1000 mg/L without causing sedimentation problems and no detectable calcium aftertaste.

Example 4

A clear metastable complex is prepared according to this invention containing 2,000 ppm Ca and stabilised with inulin (Raftilose P95 and Raftilin GR). The stabilised complex was added to water to provide 400 mg calcium and 3 g inulin per serving (500 mL).

Further, carbonated and/or sweetened/unsweetened versions were prepared. No sedimentation problems and no detectable calcium aftertaste were detected during 6 months storage at refrigeration (40° F.), room (20–25° F.) and high (100° F.) temperatures.

Example 5

8.9 g of 88% lactic acid solution added to 963 g of water at room temperature and then 8.9 g of citric acid is dissolved in this solution under agitation. The 6.9 g of calcium hydroxide and 3.0 g of magnesium hydroxide are mixed together, then added to the solution of the two acids and then are mixed together for 5–10 minutes until the metastable complex is formed as a clear solution.

Example 6

The clear metastable Calcium-Magnesium Lactate-Citrate complex formed in Example 5 was added to water up to a level of 900 mg/L of calcium and 300 mg/L magnesium and no sedimentation occurred over three months storage at low (40° F.), room (20–25° F.) and high (100° F.) temperatures. The Calcium-Magnesium fortified water was then subjected to freeze/thaw cycles and no sedimentation occurred.

What is claimed is:

1. A composition comprising a liquid food or beverage product and a fortifying amount of a clear, colorless, metastable Calcium-Magnesium Lactate-Citrate complex formed by the interaction of an alkaline calcium source and an alkaline magnesium source with a mixture of lactic and citric acids and having the formula:

$$(Ca_xMg_y)_p\{-OOC-CH_2-C(OH)(COO-)-CH_2-COO-\}_q\{CH_3-CH(OH)-COO-\}_r$$

where the ratio of x to y is from about 1.8 to 3.5:1, and where the subscripts p, q and r represent molarities of calcium hydroxide/magnesium hydroxide, citric and lactic acid, respectively, and where for every 1 mole of p, the molar ratio of q is from 20 to 0.2, and the molar ratio of r is from 0.2 to 20, respectively.

2. A composition according to claim 1 where the ratio of x to y is from about 3 to 3.5:1.

3. A composition according to claim 1 wherein the beverage product comprises a juice or fortified water.

4. A composition according to claim 1 wherein the complex is stabilized with a carbohydrate.

5. A composition according to claim 4 wherein the carbohydrate is sucrose, fructose, glucose, corn syrup, maltodextrin, oligo- and polysaccharides or a mixture thereof.

6. A composition according to claim 1 wherein the alkaline calcium source is a hydroxide, oxide or carbonate of calcium.

7. A composition according to claim 1 wherein the complex is present with an oligosaccharide or oligo- and polysaccharides.

8. A composition according to claim 7 wherein the oligosaccharide or polysaccharide is inulin or hydrolyzed inulin.

9. A composition according to claim 1 wherein the alkaline calcium source and the alkaline magnesium source is in the form of a suspension or dry powder and the mixture of lactic and citric acids is in the form of a solution.

10. A composition according to claim 1 wherein the amount of the complex present in the liquid food or beverage is from about 0.05 to 95% by weight based on the weight of the liquid food or beverage.

11. A composition according to claim 1 wherein the alkaline magnesium source is a hydroxide, oxide or carbonate of magnesium.

12. A process of preparing a fortified liquid food or beverage which comprises:

combining an alkaline calcium source and an alkaline magnesium source with lactic acid to provide a calcium, magnesium lactic acid mixture;

adding citric acid to the calcium, magnesium, lactic acid mixture to form a clear, colorless, metastable Calcium-Magnesium Lactate-Citrate complex; and incorporating a fortifying amount of the complex in a liquid food or beverage product, wherein the complex that is formed has the formula:

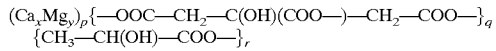

where the ratio of x to y is from about 1.8 to 3.5:1, and where the subscripts p, q and r represent molarities of calcium hydroxide/magnesium hydroxide, citric acid and lactic acid, respectively, and where for every 1 mole of p, the molar ratio of q is from 20 to 0.2, and the molar ratio of r is from 0.2 to 20, respectively.

13. A process according to claim 12 which further comprises adding a carbohydrate to the liquid food or beverage product to stabilize the complex.

14. A process according to claim 13 wherein the carbohydrate is added to the complex before the complex is added to the liquid food or beverage product and the carbohydrate is present in an amount of from 1–80% by weight based on the weight of the complex.

15. A process of preparing a fortified liquid food or beverage product which comprises:

adding an alkaline calcium source and an alkaline magnesium source to the liquid food or beverage;

adding lactic acid to the liquid food or beverage containing the calcium source and magnesium source followed by citric acid to form a clear, colorless, metastable Calcium-Magnesium Lactate-Citrate complex in situ within the product, wherein the complex has the formula:

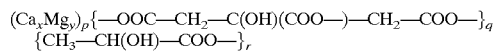

where the ratio of x to y is from about 1.8 to 3.5:1, and where the subscripts p, q and r represent molarities of calcium hydroxide/magnesium hydroxide, citric acid and lactic acid, respectively, and where for every 1 mole of p, the molar ratio of q is from 20 to 0.2, and the molar ratio of r is from 0.2 to 20, respectively.

16. A process according to claim 15 wherein the acids are added one after another or as a mixture to the product before adding the alkaline calcium source and alkaline magnesium source in the form of a suspension or dry powder.

17. A process according to claim 15 wherein the lactic acid and calcium/magnesium source are combined together first, then citric acid is added to form the complex and this complex is then combined with or added to the product.

18. A process of preparing a fortified liquid food or beverage product which comprises:

adding lactic acid and citric acid one after another or as a mixture to a liquid food or beverage; and adding an alkaline calcium source and an alkaline magnesium source to the liquid food or beverage containing the citric acid and lactic acid to form a clear, colorless, metastable Calcium-Magnesium Lactate-Citrate complex in situ within the product, wherein the complex has the formula:

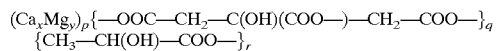

where the ratio of x to y is from about 1.8 to 3.5:1, and where the subscripts p, q and r represent molarities of calcium hydroxide/magnesium hydroxide, citric acid and lactic acid, respectively, and where for every 1 mole of p, the molar ratio of q is from 20 to 0.2, and the molar ratio of r is from 0.2 to 20, respectively.

* * * * *